April 6, 1948.  W. F. DABOLL  2,439,158
SELF THREADING SHUTTLE EYE
Filed April 6, 1946
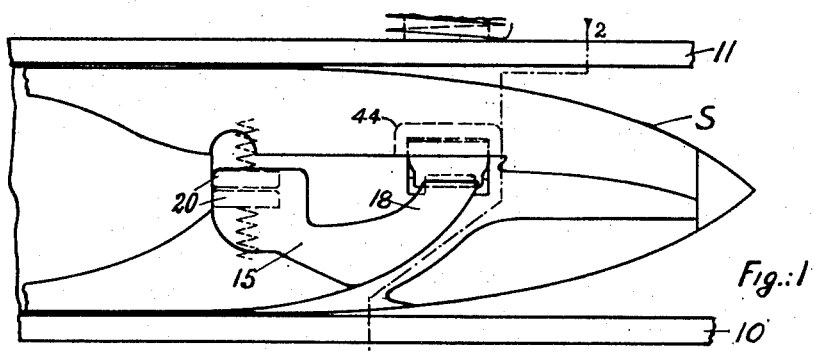
Fig.:1
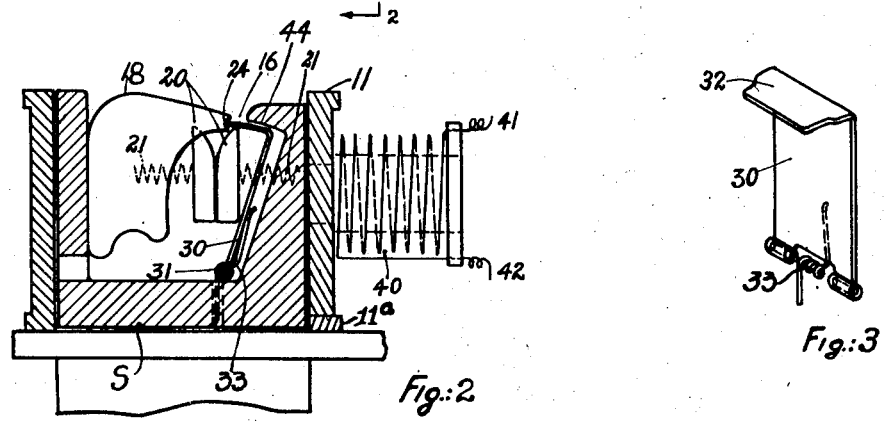
Fig.:2
Fig.:3
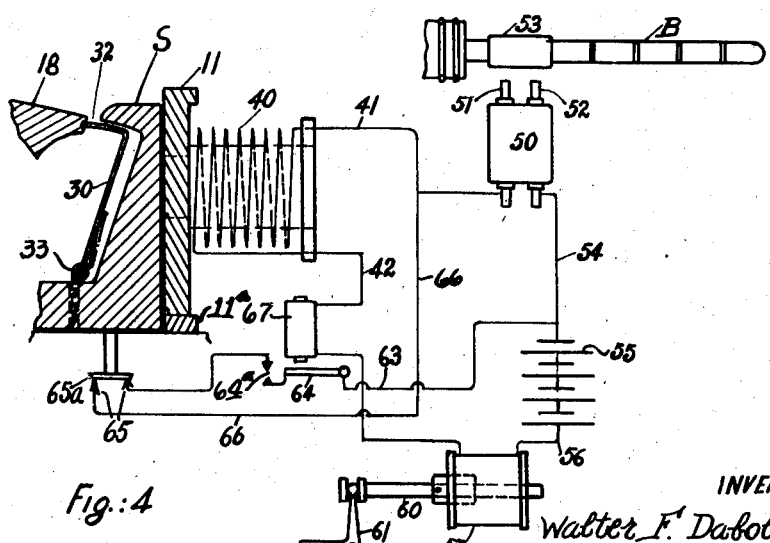
Fig.:4
INVENTOR.
Walter F. Daboll.
BY
Chas. T. Hawley ATTY.

Patented Apr. 6, 1948

2,439,158

UNITED STATES PATENT OFFICE 2,439,158

SELF-THREADING SHUTTLE EYE

Walter F. Daboll, Greensboro, N. C., assignor to Watson-Williams Manufacturing Company, Millbury, Mass., a corporation of Massachusetts Application April 6, 1946, Serial No. 660,168

6 Claims. (Cl. 139—241)

1

This invention relates to a shuttle eye of the self-threading type such as is used in automatic weft-replenishing looms. A serious difficulty in the operation of such looms arises from the fact that a shuttle eye so constructed that it will thread itself easily and reliably will often unthread with equal ease under certain operating conditions and particularly with hard-twisted or reverse-twist weft.

It is the general object of my invention to provide an improved self-threading shuttle eye having special and effective provision to prevent unthreading.

To the accomplishment of this general object, I provide a self-threading shuttle eye having a normally closed gate or trap, and I provide means by which said gate or trap will be opened as required for weft replenishment.

Preferably, my invention is used in conjunction with an electric weft detector, and the gate or trap is opened only on indication of weft exhaustion and just before weft replenishment.

My invention further relates to arrangements and combinations of parts which will be hereinafter described and more particularly pointed out in the appended claims.

A preferred form of the invention is shown in the drawings, in which

Fig. 1 is a partial plan view of a shuttle having my improved shuttle eye mounted therein;

Fig. 2 is a transverse sectional elevation, taken along the irregular line 2—2 in Fig. 1;

Fig. 3 is a perspective view of a gate or trap to be described; and

Fig. 4 is a diagrammatic view showing an electric control circuit for use in connection with my invention.

Referring to Figs. 1 and 2, I have shown portions of a shuttle S, a front box plate or binder 10, and a back box plate 11. A self-threading shuttle eye 15 is mounted in the shuttle S and provides a threading opening or passage 16 (Fig. 2) and an upper and laterally projecting portion 18. The usual friction pads 20 may be provided in the rear portion of the eye 15, and light springs 21 force these pads toward each other to provide tension on the thread.

All of these parts may be of the usual commercial construction, except that the outer end of the projection 18 is preferably notched as indicated at 24 (Fig. 2).

A gate or trap 30 (Figs. 2 and 3) is pivoted at 31 below the shuttle eye 15, and the offset upper end 32 of the trap 30 is normally held in the notch 24 by a light coil spring 33. The trap

2

30 is to be made in whole or in part of iron or steel or some other magnetic metal. The back box plate 11 is also commonly made of cast iron or steel which may be magnetized but is provided with a lower edge portion 11a of brass or other non-magnetic material and is attached to the lay with brass screws or bolts. The box plate 11 is provided with an electro-magnetic coil 40 connected by wires 41 and 42 to an electric circuit to be described.

The back part of the shuttle S adjacent the trap 30 is recessed as indicated at 44 (Figs. 1 and 2) to receive the gate 30 when the gate is withdrawn to open the threading passage 16.

It will thus appear that I have provided a shuttle having a self-threading eye into which the thread may be readily inserted when the gate 30 is withdrawn and from which the thread cannot escape so long as the gate 30 is closed.

Preferably the gate 30 is withdrawn only on indication of weft exhaustion, and in order to effect such operation and control, the coil 40 may be placed in a circuit controlled by an electric weft detector 50 (Fig. 4) having contact plungers 51 and 52 adapted to engage a metallic ferrule 53 on a bobbin B in the running shuttle.

The wire 41 previously described is connected to the plunger 51, and the plunger 52 is connected by a wire 54 to a battery 55 or other source of current. A wire 56 connects the battery 55 to a solenoid coil 57, to which the wire 42 previously described is also connected. The solenoid plunger 60 is connected to shift a lever 61 or to actuate some other electrical or mechanical device by which weft replenishment will be effected.

In order to hold the indication until weft replenishment is completed, I provide a holding circuit comprising a branch wire 63, a lever 64, contacts 64a, and additional contacts 65 which are closed by depression of a cross plate 65a when the shuttle S is in the shuttle box at the weft-detecting side of the loom. One of the contacts 65 is connected by a branch wire 66 to the wire 41 previously described, so that the holding circuit is in parallel with the circuit through the electrical weft detector plungers and the ferrule 53. I also provide a magnet 67 connected in series with the magnet coil 40 and the solenoid coil 57.

When contact is closed through the plungers 51 and 52 and ferrule 53, the magnet 67 is energized, the contacts 64a are closed, and the contacts 65 are already closed by entry of the shuttle S into the weft-detecting box. The circuit through the coil 40, magnet 67, solenoid coil 57 and battery 55 will thereafter be maintained closed until weft replenishment is completed and until the shuttle S is picked from the weft-detecting box, whereupon the contacts 65 will open and the holding circuit will be broken.

With the circuit thus described, engagement of the plungers 51 and 52 with the ferrule 53 on weft exhaustion will complete a circuit through the magnet coil 40 and also through the solenoid 57. Weft replenishment will thus be initiated and at the same time the gate 30 will be withdrawn into the recess 44 so that the passage 16 will be open for entry of the new thread on replacement of the exhausted bobbin.

When this described circuit is thereafter broken by picking the shuttle S from the detecting box as above described, the gate 30 will be released and will be moved forward by the spring 33 to close the opening 16 and prevent unthreading of the shuttle. Consequently by the addition of a single and very simple moving part, I positively prevent unthreading of the shuttle, which has heretofore been a serious objection to the use of self-threading shuttle eyes on certain kinds of fabric.

The holding circuit herein described is illustrative only and is designed for looms in which weft replenishment is completed in the same cycle with weft detection. Where replenishment is delayed, modification of the holding circuit may be indicated.

Having thus described my invention and the advantages thereof, I do not wish to be limited to the details herein disclosed, otherwise than as set forth in the claims, but what I claim is:

1. In a weft replenishing loom, a shuttle having a self-threading eye with a thread passage therethrough, a gate normally closing said passage and made at least in part of magnetic material, a shuttle box plate of magnetic material, and means to magnetize said box plate on indication of weft exhaustion and to thereby magnetize and effect withdrawal of said gate to open said passage for weft replenishment.

2. In a weft replenishing loom, a shuttle having a self-threading eye with a thread passage therethrough, a gate normally closing said passage, said gate being made at least in part of magnetic material, a box for said shuttle including a back box plate also of magnetic material, and means to magnetize said back box plate and to thereby magnetize and move said gate to open said passage for weft replenishment.

3. In a weft replenishing loom, a shuttle having a self-threading eye with a thread passage therethrough, a gate normally closing said passage, said gate being pivoted in said shuttle and being made at least in part of a magnetic material, a weft detector, and electromagnetic means controlled by said detector and directly operable on said gate to withdraw said gate from normal passage-closing position by direct magnetic force on indication of weft exhaustion.

4. In a weft replenishing loom, a shuttle having a self-threading eye with a thread passage therethrough, a gate normally closing said passage, a weft detector operative to effect weft replenishment on indication of weft exhaustion, and means controlled by said weft detector and effective to set up a magnetic field about said gate and to thereby magnetize and effect movement of said gate to open said thread passage on indication of weft exhaustion.

5. In a weft replenishing loom, a shuttle having a self-threading eye with a thread passage therethrough, a gate normally closing said passage, an electric weft detector operative to effect weft replenishment on indication of weft exhaustion, and electromagnetic means normally in series with said weft detector and effective to open said gate simultaneously with indication of weft exhaustion.

6. In a weft replenishing loom, a weft detector, a shuttle having a self-threading eye with a thread passage therethrough, a gate normally closing said passage, said gate being pivoted in said shuttle and being made at least in part of a magnetic material, a spring normally effective to hold the offset outer end of said gate against a projecting portion of said eye to close said thread passage, and electromagnetic means controlled by said weft detector and effective to overcome said spring and swing said gate to open said passage for weft replenishment by direct application of magnetic force to said gate.

WALTER F. DABOLL.

REFERENCES CITED

The following references are of record in the file of this patent:

UNITED STATES PATENTS

| Number | Name | Date |
|---|---|---|
| 655,648 | Baker | Aug. 7, 1900 |
| 691,456 | Edwards | Jan. 21, 1902 |
| 718,576 | Northrop | Jan. 13, 1903 |
| 1,268,136 | McGuiness | June 4, 1918 |
| 2,146,611 | Young | Feb. 7, 1939 |